United States Patent Office 3,822,227
Patented July 2, 1974

3,822,227
HOMOGENEOUS MIXTURES OF POLYAMIDES
AND POLYOLEFINS
Karl Heinz Hermann and Kurt Schneider, Krefeld-Uerdingen, Germany, assignors to Bayer Aktiengesellschaft, Leverkusen, Germany
No Drawing. Continuation-in-part of abandoned application Ser. No. 167,813, July 30, 1971. This application Jan. 18, 1973, Ser. No. 324,602
Claims priority, application Germany, Aug. 1, 1970, P 20 38 317.9
Int. Cl. C08f 45/52
U.S. Cl. 260—28.5 A    3 Claims

ABSTRACT OF THE DISCLOSURE

The present invention relates to a homogeneous mixture of polyamide, polyolefin and an oxidised wax and the preparation of said mixture.

---

This is a continuation-in-part application of the application Ser. No. 167,813, filed July 30, 1971, and now abandoned.

This invention relates to homogeneous mixtures of polyamides and polyolefins and to a process for their production.

It is known that mixtures of polyamides and polyolefines can be produced by fusing together the solid, granular or powder-form polyamides and polyolefins in a screw extruder, followed by mixing in the melt. Unfortunately, the properties of the mixtures thus produced are unsatisfactory because, due to the incompatibility of the two components, it is impossible to obtain sufficiently fine dispersion of the polyolefins in the polyamide, even when special screw extruders having an intensive kneading effect are used. For example, injection mouldings produced from mixtures of this kind show inhomogeneties, streaks and surface faults.

In addition, attempts have been made, in a modification of this process, to link the polyamide and polyolefin macromolecules chemically by the addition of peroxides or other radical-forming substances and hence to obtain a more homogeneous mixture. The products obtained in this way also have certain disadvantages. For example, they are partly cross-linked and their notched impact strength is inferior to that of the pure polyamide or polyolefin.

It has now been found that homogeneous mixtures of polyamides and polyolefines having improved properties can be obtained by using oxidised waxes as a further additive.

Accordingly, the present invention relates to a homogeneous polyamide/polyolefin mixture which comprises:

(a) from 70 to 99% by weight, based on the total quantity of polyamide and polyolefin, of at least one polyamide,
(b) from 30 to 1% by weight, based on the total quantity of polyamide and polyolefin, of at least one polyolefin and
(c) from 0.1 to 10% by weight, based on the polyamide component, of at least one oxidised wax.

The mixtures preferably comprise:

(a) from 80 to 95% by weight, based on the total quantity of polyamide and polyolefin, of the polyamide-component, (b) from 20 to 5% by weight, based on the total quantity of polyamide and polyolefin, of the polyolefin-component, and
(c) from 0.5 to 5% by weight, based on the polyamide component, of the oxidised wax-component.

Linear polyamides used in the context of the invention are of the general type described in U.S. Pats. 2,071,250; 2,071,253; 2,130,948; 3,015,652 and 3,513,135. These polyamides in general comprise the reaction products of linear polymer-forming compositions containing amide-forming groups, e.g. difunctional molecules each of which contains two reactive amide-forming groups. Such polyamides can be prepared by various methods, for example, by self polymerisation of a monoaminocarboxylic acid or lactam, or by reacting a diamine with a dibasic carboxylic acid in substantially equal molecular amounts. The average number of carbon atoms separating the amide groups in these reactants is at least two. Examples of particular suitable polyamides are polycaprolactam, polyoenanthic lactam, polycaprylic lactam, polylauric lactam, poly-11-amino-undecanoic acid, polyhexamethylene adipamide, polyhexamethylene sebacamide and polyhexamethylene dodecanoamide, or mixtures of said polymers.

In the context of the invention, polyolefines are completely or substantially linear high molecular weight polymers of $\alpha$-monoolefins, for example polyethylene, polypropylene or polyisobutylene, and copolymers of $\alpha$-monoolefins with other unsaturated monomers, for example ethylene/vinyl acetate copolymers whose ester groups may optionally be partly or completely hydrolysed, ethylene/(methyl)acrylic acid copolymers, ethylene/maleic anhydride copolymers, ethylene/(methyl)acrylic acid ester copolymers, ethylene/N-vinyl pyrrolidone copolymers, ethylene/acrylonitrile copolymers, and ethylene/(meth) acrylamide copolymers. The polyolefins can be obtained by any of the usual processes, for example by "high-pressure polymerisation" (English Pat. 471,590) by "low-pressure polymerisation" (K. Ziegler German Pat. 973,626) in the presence of Ziegler catalysts, or by radically initiated bulk, suspension or emulsion polymerisation. They can be crystalline or amorphous. Their molecular weight should amount preferably from 1,000 to 1,000,000 and most preferably from 10,000 to 500,000.

The oxidized waxes used according to the invention are obtained by oxidising natural or synthetic waxes such as montan waxes (ester waxes obtained by extraction of brown coal), micro-waxes (high melting microcrystalline paraffins), synthetic paraffins and polyethylene waxes. The montan waxes are converted into the so-called acid waxes by oxidation with chromosulphuric acid in the presence of chromic salts (German Pats. 509,373 and 573,-925). The other waxes are oxidised by blowing oxygen through the melt of the wax in the presence of the oxides of mangane, cobalt, or nickel. (German Pat. 1,046,308 and 1,054,706.)

The following are examples of oxidised waxes:

1. The so-called acid waxes having acid numbers of from 50 to 200, preferably from 90 to 160;
2. Oxidised polyethylene waxes having molecular weights of from 500 to 20,000, preferably from 1,000 to 5,000; acid numbers of from 1 to 200, preferably from 5 to 100; and saponification numbers of from 1 to 200, preferably from 10 to 100;

3. Oxidised synthetic paraffins having acid numbers of from 5 to 200 and preferably from 15 to 160;
4. Oxidised microwaxes According to one embodiment of the invention (a) the mixtures are prepared by mixing the polyamide component in molten form simultaneously with the polyolefin component and the wax component, or initially with the wax component and subsequently with the polyolefin component, or with a previously prepared mixture of the polyolefin and wax component.

Conventional mixers, for example, single-shaft or multi-shaft screw extruders or kneaders, can be used for this purpose.

According to a further embodiment (b) the wax component is mixed with the polyamide component, before or during polymerisation or polycondensation, by adding it to the monomers before polymerisation or by mixing it with the polyamide melt at any time during polymerisation by using for example, conventional mixers such as stirrers, kneaders or screw extruders. After isolation of the polyamide in powder or in granulate form the polyamide is mixed optionally in molten form with the polyolefin. Conventional mixers, for example, single-shaft or multi-shaft screw extruders or kneaders, can be used for this purpose.

Preferably, however, (c) the polyolefin component and the wax component are mixed, simultaneously or successively, separately or in the form of a previously prepared mixture, with the polyamide component before or during polymerisation or polycondensation, by adding them to the polyamide-forming starting materials before polymerisation, or by mixing them with the polyamide melt at any time during polymerisation, for example using conventional mixers such as stirrers, kneaders or screw extruders. The particular advantage of this procedure is that the mixture according to the invention can be produced in a single stage, thus eliminating the need for the additional process stages which have to be carried out in the processes hitherto described.

The production of the polyamides by methods (b) and (c) can be carried out in the usual way, either non-continuously, for example in autoclaves, or continuously for example in tubular reactors or several reaction vessels arranged one after the other cascade-fashion. The polymerisation of lactams can be carried out in the presence of conventional polymerisation catalysts, for example water or substances which give off water such as aminocaproic acid or hexamethylene diammonium adipate, acids such as phosphoric acid or alkaline catalysts such as sodium hydride, sodium caprolactam or sodium methoxide.

The polyamide/olefinpolymer mixtures according to the invention can also contain conventional additives, such as pigments, dyes, light and heat stabilisers, weather stabilisers, optical brighteners, plasticisers, crystallisation stimulators, chain terminators, lubricants and mould-release agents and, in particular, fillers, for example kaolin, glass or asbestos fibres, chalk, talcum, powdered quartz, carbon fibres, mica or feldspar.

The polyamide olefinpolymer mixtures according to the invention are distinguished from pure polyamides *inter alia* by improved impact strength, in particular notched impact strength, reduced water absorption and improved electrical properties. They also show outstanding processing properties, for example good free-flow properties and outstanding mould-release properties, and can be processed by the usual methods, for example by injection-moulding, extrusion, melt-spinning or deep-drawing, into satisfactorily homogeneous shaped bodies such as filaments, fibres, films, bristles, domestic articles, machine components such as gear wheels and housings, and semi-finished technical products.

Example 1

Various different mixtures, (tests 1–19) each comprising:

(a) 15 g. of ε-caprolactam,
(b) 500 kg. of ε-aminocaproic acid,
(c) various different quantities of polyethylene, and
(d) various different quantities of an oxidised wax were polymerised in the usual way in an autoclave at 270° C. The polyethylene-containing polyamide melt was then spun in the form of an approximately 3 mm. diameter wire into a water bath and granulated. The granulate was freed from low molecular weight components by boiling with water and dried.

The relative viscosity of the products thus obtained was measured on a 1% by weight solution in $m$-cresol at 25° C. in an Ubbelohde viscosimeter.

In addition, the products were processed in a conventional screw injection-moulding machine into the corresponding standard test specimens on which notched impact strength was measured in accordance with DIN 5453 in the freshly injected state. In addition, the surface quality of the test specimens was visually assessed.

The results of the different tests and the values measured on the test specimens are set out in Table 1 below. Tests 10 to 16 are Comparison Tests.

A high pressure polyethylene with a density of 0.923 g./cc. was used as the polyethylene. The following waxes were used as the oxidised waxes:

1. An oxidised polyethylene wax A, having an acid number of 30 and a melting point of 97° C.;
2. An oxidised polyethylene wax B, having an acid number of 16, an average molecular weight of approximately 2000, and a solidification point of 88° C.;
3. An oxidised polyethylene wax C, having an acid number of 25, an average molecular weight of approximately 2000 and a solidification point of 85° C.;
4. An acid wax D, having an acid number of 145 and a solidification point of 75° C.;
5. An acid wax E, having an acid number of 120 and a solidification point of 77° C.

Example 2

A mixture of 15 kg. of ε-caprolactam, 500 g. of ε-aminocaproic acid, 1.5 kg. of an ethylene/vinyl acetate copolymer and 150 g. of wax A (cf. Example 1) was polymerised and worked up in the same way as described in Example 1. The product had a relative viscosity of 2.89. The surface of the moulding was satisfactory; notched impact strength=10.8 kp. cm./cm.$^2$.

Example 3

A mixture of 15 kg. of ε-caprolactam, 500 g. of ε-aminocaproic acid, 1.5 kg. of a low pressure polyethylene with a density of 0.963 g./cc. and 300 g. of wax A (cf. Example 1) was polymerised and worked up in the same way as described in Example 1. The product had a relative viscosity of 3.01. The surface of the moulding was satisfactory; notched impact strength=7.2 kp. cm./cm.$^2$.

Example 4

A mixture of 15 kg. of ε-caprolactam, 500 g. of ε-aminocaproic acid, and 300 g. of wax A (cf. Example 1) was polymerised in the usual way in an autoclave at 270° C. After a polymerisation time of approximately 4 hours, 1.5 kg. of a high pressure polyethylene with a density of 0.923 g./cc. were introduced into the autoclave in the absence of oxygen and mixed while stirring with the polyamide melt. The mixture was then polymerised for another 8 hours at 270° C. after which it was worked up as in Example 1. The product had a relative viscosity of 2.91. The surface of the moulding was satisfactory; notched impact strength=6.6 kp. cm./cm.$^2$.

TABLE 1

| Test No. | Polyethylene Kg. | Polyethylene Percent* | Oxidised wax | Grams | Percent* | Relative viscosity | Surface of moulding | Notched impact strength, cm.kp./cm.² |
|---|---|---|---|---|---|---|---|---|
| 1 | 1.5 | 10 | Wax A | 150 | 1 | 3.03 | Satisfactory | 6.0 |
| 2 | 1.5 | 10 | do | 300 | 2 | 2.87 | do | 6.9 |
| 3 | 1.5 | 10 | do | 450 | 3 | 2.79 | do | 5.9 |
| 4 | 1.5 | 10 | Wax B | 300 | 2 | 2.69 | do | 6.3 |
| 5 | 1.5 | 10 | Wax C | 300 | 2 | 2.93 | do | 8.3 |
| 6 | 1.5 | 10 | do | 450 | 3 | 2.66 | do | 7.7 |
| 7 | 1.5 | 10 | Wax D | 300 | 2 | 2.60 | do | 6.1 |
| 8 | 2.25 | 15 | Wax E | 300 | 2 | 2.67 | do | 7.8 |
| 9 | 2.25 | 15 | Wax A | 300 | 2 | 3.27 | do | 10.4 |
| 10 |  |  | do | 300 | 2 | 2.91 | do | 3.6 |
| 11 |  |  | Wax B | 300 | 2 | 2.88 | do | 4.1 |
| 12 |  |  | Wax C | 300 | 2 | 2.95 | do | 3.8 |
| 13 |  |  |  |  |  | 3.01 | do | 4.2 |
| 14 | 1.5 | 10 |  |  |  | 2.98 | Inhomogeneous streaks and bubbles | 3.5 |
| 15 | 9.82 | 65.5 | Wax A | 1,227 | 8.2 | 2.26 | | 2.4 |
| 16 | 15.0 | 100 | do | 1,500 | 10 | 2.12 | | 1.3 |
| 17 | 4.82 | 32.1 | do | 964 | 6.4 | 2.47 | Satisfactory | 4.4 |
| 18 | 3.51 | 23.4 | do | 526 | 3.5 | 2.66 | do | 5.9 |
| 19 | 2.44 | 16.3 | do | 325 | 2.2 | 2.74 | do | 6.5 |

)Percent by weight based on caprolactam.

What is claimed is:

1. A homogeneous polyamide/olefin-polymer mixture which comprises:
   (a) from 80 to 95% by weight, based on the total quantity of polyamide and olefin polymer, of at least one polyamide;
   (b) from 20 to 5% by weight, based on the total quantity of polyamide and olefin polymer, of polyethylene; and
   (c) from 0.5 to 5% by weight, based on the polyamide component, of at least one oxidized wax selected from the group consisting of an acid wax, an oxidized polyethylene wax having a molecular weight from $10^3$ to $5.10^3$, oxidized synthetic paraffins and an oxidized micro wax.

2. A homogeneous mixture as claimed in claim 1, which comprises:
   (a) from 80 to 95% by weight, based on the total quantity of polyamide and polyolefin, of the polyamide component,
   (b) from 20 to 5% by weight, based on the total quantity of polyamide and polyolefin, of the polyolefin component and
   (c) from 0.5 to 5% by weight, based on the polyamide component, of the oxidised wax component.

3. A homogeneous mixture as claimed in claim 1, wherein polycaprolactam, polyoenanthic lactam, polycaprylic lactam, polylauric lactam, poly-11-amino-undecanoic acid, polyhexamethylene adipamide, polyhexamethylene sebacamide, polyhexamethylene dodecanoamide or a mixture of said polymers is used as the polyamide component.

References Cited
UNITED STATES PATENTS
3,250,823   5/1966   Zeitlin _____ 260—857 R LEWIS T. JACOBS, Primary Examiner P. R. MICHL, Assistant Examiner U.S. Cl. X.R.

260—28, 28.5 R, 28.5 AV, 857 L, 857 U